US008155678B2

(12) United States Patent
Lira et al.

(10) Patent No.: US 8,155,678 B2
(45) Date of Patent: Apr. 10, 2012

(54) EMAIL SYSTEM PROVIDING ACCOUNT PROVISIONING BASED UPON DEVICE-SUPPORTED MARKUP LANGUAGE AND RELATED METHODS

(75) Inventors: Chris Lira, Bellevue, WA (US); Nikhil Deshpande, Issaquah, WA (US)

(73) Assignee: Research In Motion Limited, Waterloo, Ontario (CA)

( * ) Notice: Subject to any disclaimer, the term of this patent is extended or adjusted under 35 U.S.C. 154(b) by 424 days.

(21) Appl. No.: 11/538,964

(22) Filed: Oct. 5, 2006

(65) Prior Publication Data

US 2008/0085729 A1   Apr. 10, 2008

(51) Int. Cl.
*H04W 4/00* (2009.01)
*G06F 17/00* (2006.01)
(52) U.S. Cl. .................... 455/466; 715/239
(58) Field of Classification Search .................... 455/466
See application file for complete search history.

(56) References Cited

U.S. PATENT DOCUMENTS

| 7,028,252 | B1 * | 4/2006 | Baru et al. ............... 715/273 |
|---|---|---|---|
| 2003/0115365 | A1 * | 6/2003 | Lindsey .................. 709/246 |
| 2007/0133876 | A1 * | 6/2007 | Chande et al. ........... 382/181 |
| 2007/0143745 | A1 * | 6/2007 | Dasari et al. ............. 717/136 |
| 2007/0192683 | A1 * | 8/2007 | Bodin et al. ............. 715/513 |

FOREIGN PATENT DOCUMENTS

| EP | 1416397 | 5/2004 |
|---|---|---|
| EP | 1482702 | 12/2004 |
| EP | 1482702 A1 * | 12/2004 |

OTHER PUBLICATIONS

Fling, *Mobile Design: The Mobile Device Detection Problem*, available at www.mobiledesign.org.
Passani, *Introducing WALL a Library to Multiseive Applications on the Wireless Web*, 2002-2006, available at www.wurfl.sourceforge.net.
Passani, *So... What is WURFL?*, 2002-2006, available at www.wurfl.sourceforge.net.

* cited by examiner

*Primary Examiner* — Charles Appiah
*Assistant Examiner* — Natasha Cosme
(74) *Attorney, Agent, or Firm* — Allen, Dyer, Doppelt, Milbrath & Gilchrist, P.A.

(57) ABSTRACT

An email communications system may include a plurality of wireless communications devices each supporting at least one markup language from among a plurality of different markup languages, and an electronic mail (email) server. The email server may include an account provisioning module for determining the at least one markup language supported by a given wireless communications device, providing at least one respective markup language provisioning template to the given wireless communications device based upon the supported at least one markup language, and generating a provisioned email account for the given wireless communications device based upon at least one provisioning parameter returned via the at least one markup language provisioning template. The email server may further include a mail-user agent module for forwarding emails to the given wireless communications device based upon the provisioned email account therefor.

20 Claims, 5 Drawing Sheets

PLEASE PROVIDE THE FOLLOWING INFORMATION FOR YOUR DEVICE

PIN:

IMEI:

NEXT
CANCEL

*FIG. 2*

TO ADD AN EMAIL ACCOUNT, COMPLETE THE FOLLOWING FIELDS

EMAIL ADDRESS:

PASSWORD:

CONFIRM PASSWORD:

[ NEXT ]  [ DONE ]  [ CANCEL ]

EMAIL SYSTEM PROVIDING ACCOUNT PROVISIONING BASED UPON DEVICE-SUPPORTED MARKUP LANGUAGE AND RELATED METHODS

FIELD OF THE INVENTION

The present invention relates to the field of communications systems, and, more particularly, to wireless electronic mail (email) communications systems and related methods.

BACKGROUND OF THE INVENTION

Electronic mailboxes are used to store electronic mail (email) messages Electronic mailboxes are connected to the Internet to enable users to send and receive incoming and outgoing email messages. These mailboxes may also be extended to deliver email to mobile wireless communication devices via wireless networks. In the case of a corporation, electronic mailboxes are typically located on email servers at the corporation. On the other hand, mailboxes for small businesses or individuals are typically located on Internet service provider (ISP) email servers.

Mail user agents (MUAs) are applications which use a technique called polling to relay messages from the mail server to the mail program at a user's computer or mobile wireless communications device. A MUA is a program running either on a user's personal computing device (mobile or stationary), or on a shared email relay server that checks for new mail on behalf of a multitude of such users. More particularly, polling is the retrieval of incoming messages from other users at the mail server and delivery of these messages to the user's mailbox.

Generally speaking, a user will have to establish a profile or account so that a mail user agent on an email relay server can perform the desired polling operations. The mail user agent will need to know information such as the unique identifiers of the user's wireless device, as well as the appropriate account information for the email account(s) from which the user wants emails relayed to the handheld device. It is generally undesirable to use live customer support personnel to interface with users to provision new email accounts, as this increases the number of support staff required to support the customer base and, therefore, increases operating costs.

The more desirable approach is to use a Web interface so that customers can log on to an email relay system including the MUA and provide the necessary information through the Web interface to allow the email relay system to automatically provision the account. While such Web interfaces are relatively straightforward to serve to users using a Hypertext Markup Language (HTML) based browser, such as on a personal computer (PC) or Mac, for example, this task becomes more difficult when attempting to serve up a Web interface to mobile device browsers. This is because wireless communications device browsers are typically not HTML-based browsers. Rather, many wireless communications device browsers typically use a less feature-rich markup language, namely the Wireless Markup Language (WML), due to the processing and memory constraints of mobile devices compared to a PC or Mac. However, as device computing capabilities continue to improve, some device manufacturers are beginning to implement browsers that support more sophisticated markup languages, such as the Extensible HyperText Markup Language (XHTML), for example.

Because of the numerous types of wireless communications devices that are available, and the differences in browsers supported by different devices, serving up Web-based content to mobile devices in general can be problematic for content providers. To serve up content that is tailored to a specific device, some providers try to detect the type of device attempting to access their Web site so that they can determine what browser and feature capabilities the device has. One article which discusses some of the challenges and difficulties of wireless communications device detection is "The Mobile Device Detection Problem" by Brian Fling, available at mobiledesign.org. In this article, Fling discusses three potential approaches to making device detection work, namely a third-party translation service, a device detection API that publishers can point to for centralizing the device user-agents, and a reverse device detection scheme. Yet, Fling concludes that the tools to allow common Web content publishers to create mobile versions of their Web pages are not yet readily available, and that device detection remains a significant obstacle for Web content publishers.

Accordingly, improved approaches for tailoring Web-based content for different types of wireless communications device browsers are needed. This may particularly appropriate where a user is required to provide information through a wireless communications device Web browser, such as for email MUA provisioning, for example.

BRIEF DESCRIPTION OF THE DRAWING

FIGS. 2 and 3 are front views of a wireless communications device display of FIG. 1 illustrating markup language templates for collecting provisioning parameters from the wireless communications device.

DETAILED DESCRIPTION OF THE PREFERRED EMBODIMENTS

Figure 1:
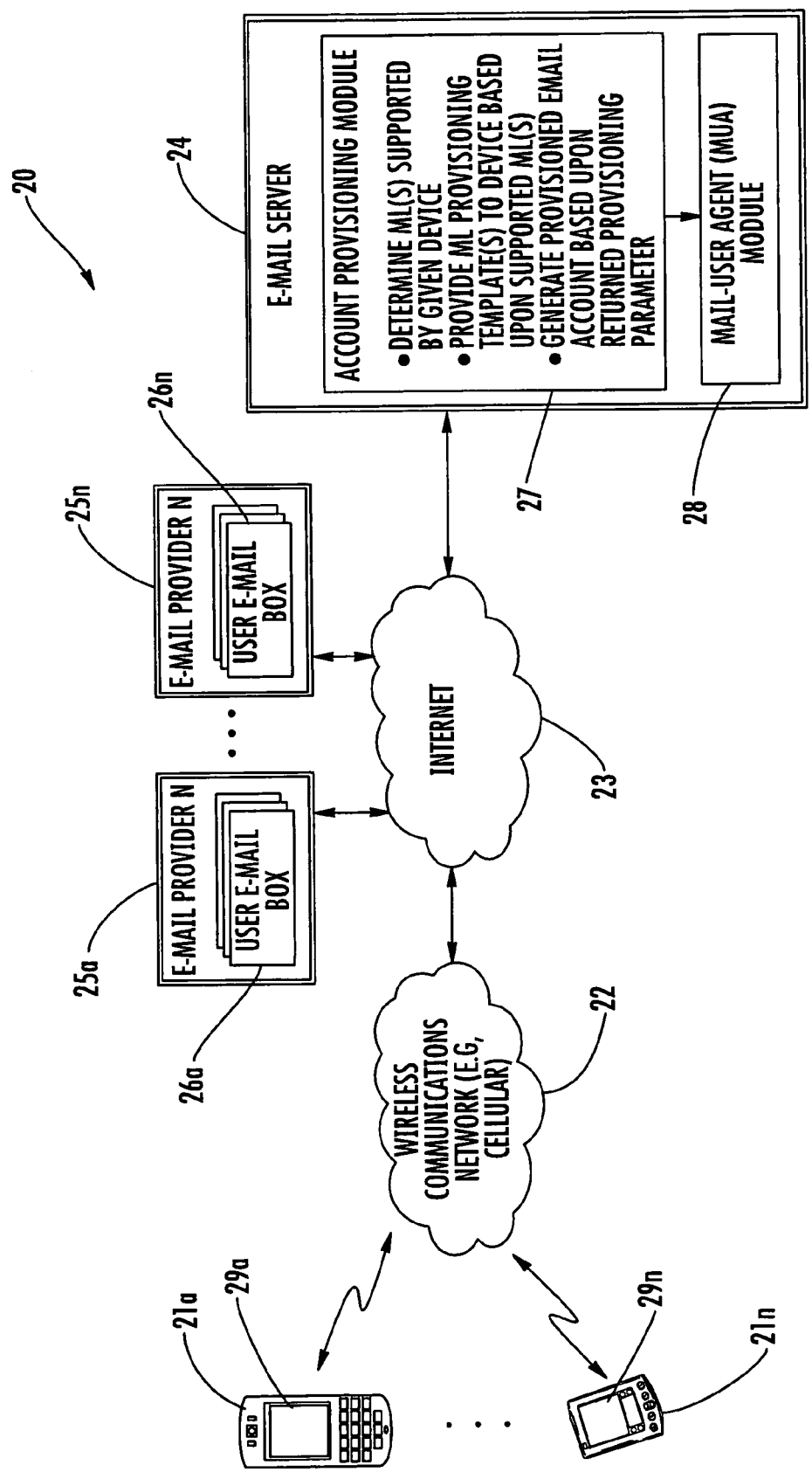
FIG. 1 is a schematic block diagram of an email system in accordance with one exemplary embodiment.
Figure 4:
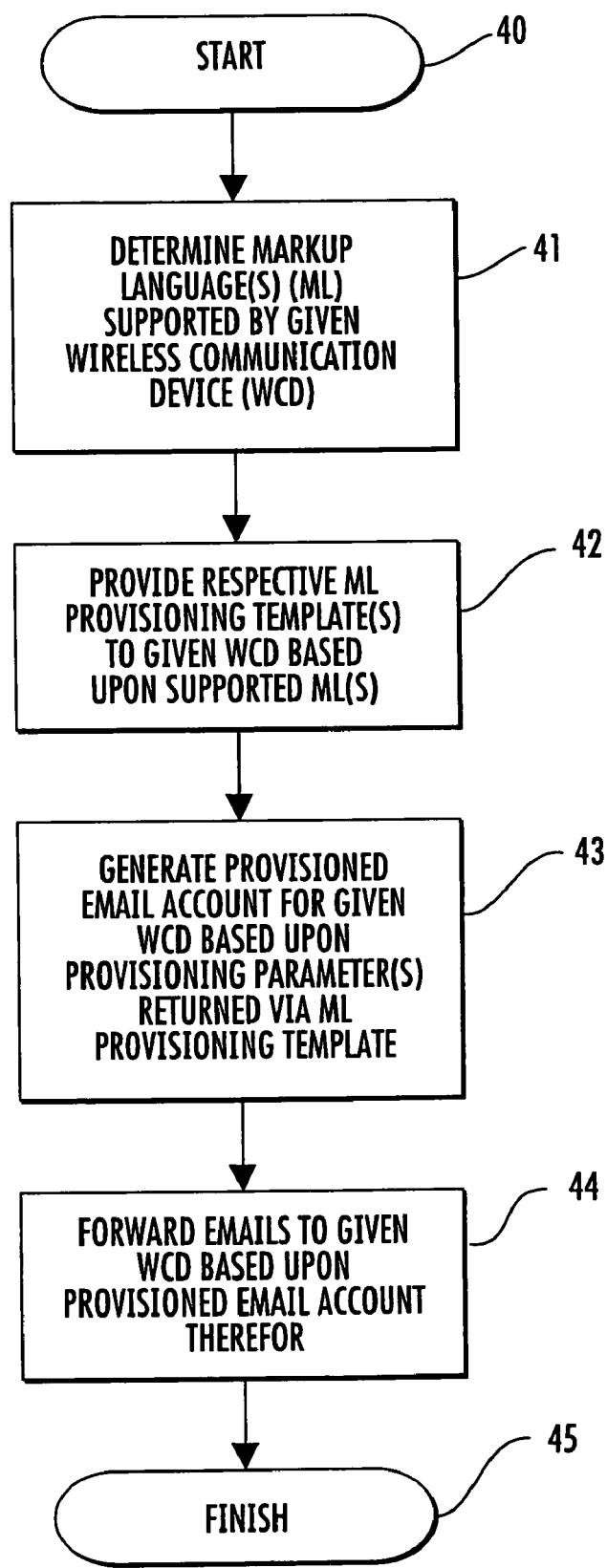
FIGS. 4 and 5 are flow diagrams illustrating exemplary communications method aspects.
Figure 5:
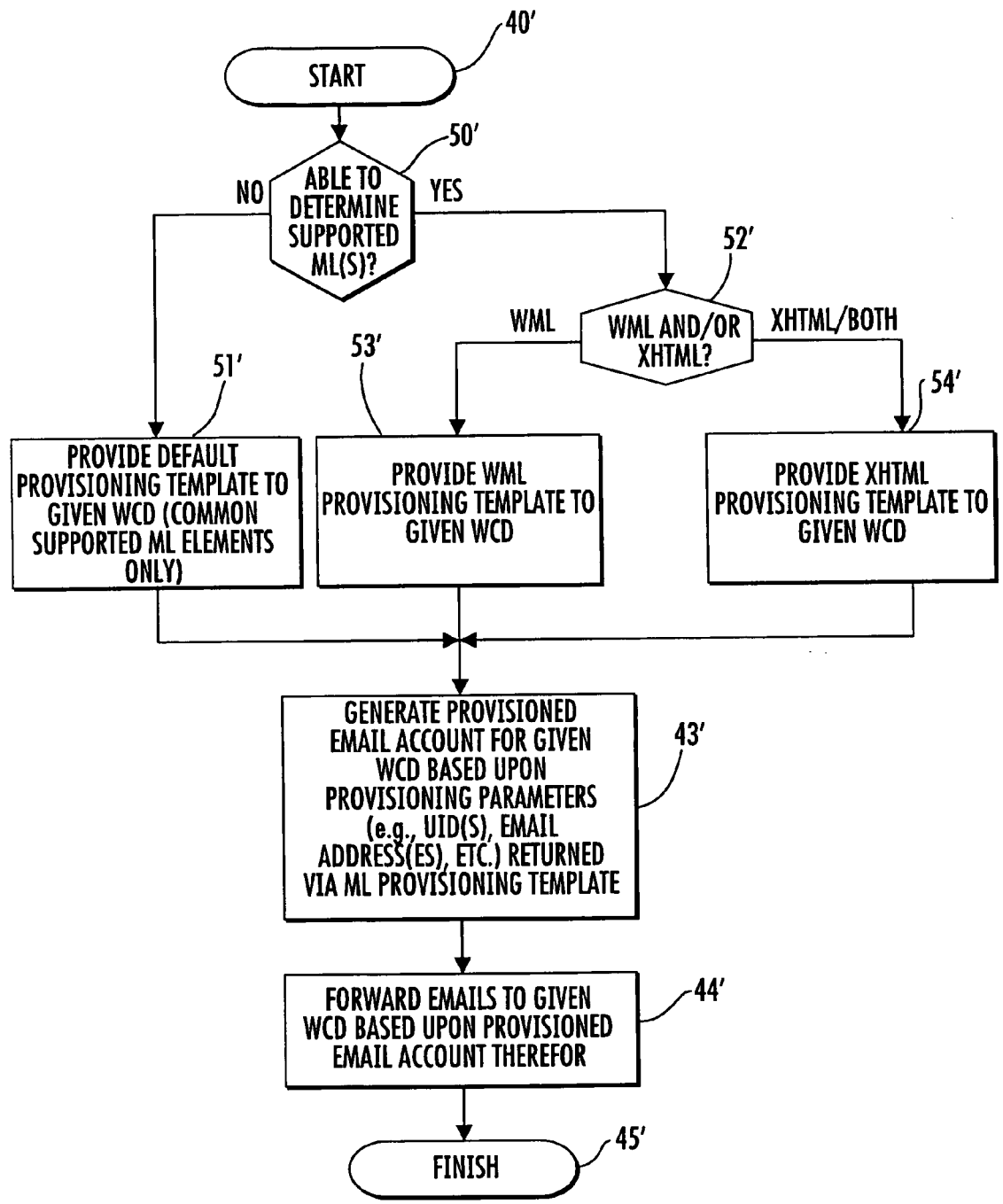

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in different embodiments.

Generally speaking, an email communications system is disclosed herein which may include a plurality of wireless communications devices each supporting at least one markup language from among a plurality of different markup languages, and an electronic mail (email) server. The email server may include an account provisioning module for determining the at least one markup language supported by a given wireless communications device, providing at least one respective markup language provisioning template to the given wireless communications device based upon the supported at least one markup language, and generating a provisioned email account for the given wireless communications device based upon at least one provisioning parameter returned via the at least one markup language provisioning template. The email server may further include a mail-user agent module for forwarding emails to the given wireless communications device based upon the provisioned email account therefor.

More particularly, each wireless communications device may have at least one unique identification (ID) associated therewith, and the at least one provisioning parameter returned via the at least one markup language provisioning template may include the at least one unique ID of the given wireless communications device. Also, the at least one provisioning parameter returned via the at least one markup language provisioning template may include at least one email address.

In addition, at least one of the plurality of wireless communications devices may support at least two of the plurality of different markup languages As such, the account provisioning module may provide the at least one respective markup language provisioning template based upon a most capable one of the at least two markup languages The account provisioning module may provide a default markup language provisioning template to the given wireless communications device if the account provisioning module is unable to determine the at least one supported markup language, for example. More particularly, the default markup language provisioning template may include only common markup language elements supported by all of the plurality of different markup languages.

By way of example, the plurality of markup languages may include a Wireless Markup Language (WML) and an Extensible Hypertext Markup Language (XHTML). Also, the wireless communications devices may be cellular communications devices, for example.

An email communications method aspect for a plurality of wireless communications devices each supporting at least one markup language from among a plurality of different markup languages may include determining the at least one markup language supported by a given wireless communications device, and providing at least one respective markup language provisioning template to the given wireless communications device based upon the supported at least one markup language. The method may further include generating a provisioned email account for the given wireless communications device based upon at least one provisioning parameter returned via the at least one markup language provisioning template. Furthermore, emails may be forwarded to the given wireless communications device based upon the provisioned email account therefor.

A computer-readable medium having computer-executable modules may include an account provisioning module for determining the at least one markup language supported by a given wireless communications device from among a plurality of wireless communications devices, each wireless communications device supporting at least one markup language from among a plurality of different markup languages. The account provisioning module may also be for providing at least one respective markup language provisioning template to the given wireless communications device based upon the supported at least one markup language, and generating a provisioned email account for the given wireless communications device based upon at least one provisioning parameter returned via the at least one markup language provisioning template. The computer-readable medium may further include a mail-user agent module for forwarding emails to the given wireless communications device based upon the provisioned email account therefor.

Referring initially to FIG. 1, an email communications system 20 illustratively includes a plurality of wireless communications devices 21a-21n, each of which has a respective display 29a-29n. Moreover, each wireless communications device 21a-21n supports at least one markup language from among a plurality of different markup languages. That is, the wireless communications devices 21a-21n have Web browsers that use/support different types of markup languages. Generally speaking, wireless communications device browsers are used for retrieving and viewing Web-based content from Web servers via wireless communications (e.g., cellular or wireless LAN) networks connected to the World Wide Web/Internet 23.

In particular, one common type of browser used on wireless handheld devices is the Wireless Application Protocol (WAP) based browser, which supports the Wireless Markup Language (WML) Another markup language supported by some wireless communications device browsers is XHTML. Generally speaking, XHTML is a more restrictive version of HTML that does not support all of the features of HTML, but at the same time supports some advanced features not supported by WML. By way of example, some of the more advanced features supported by XHTML with respect to WML include browser buttons, graphics/icons, etc. Some browsers will support more than one markup language (e.g., WML and XHTML). Moreover, other formats continue to be developed. For example, another scaled-down version of the HTML language that is being implemented in some networks is Compact HTML (CHTML). For clarity of explanation, the following examples will focus on WML and XHTML, but it will be appreciated by those skilled in the art that the system and methods set forth herein may also be used with other markup languages such as CHTML, etc.

As discussed above, there is a wide variety of wireless communications devices available, and many of these devices use different types of browsers that support different versions and types of markup languages (e.g., WML 1.x, WML 2.x, XHTML 1.x, etc.). Accordingly, it can be very difficult for Web content providers or publishers to serve appropriately formatted Web pages or information to such browsers because the publishers typically will not know what type of browser/markup language is being used by a given device. This problem may be particularly acute where the Web server requires the user to interact with a page or template served to the device to provide the server with information, such as password and other account information. This is especially true with email systems where a user wishes to provision an account so that a mail user agent (MUA) can forward emails for one or more user email accounts to the user's wireless communications device. More particularly, the email accounts are hosted by email providers 25a-25n, each of which provides one or more dedicated user email boxes 26a-26n for respective users for receiving emails addressed to the user's unique email address, as will be appreciated by those skilled in the art. As used herein, "email provider" is generally meant to include any entity that provides users with access to email, including but not limited to corporate email providers, IPSs, etc.

In the present example, an email server 24 illustratively includes an account provisioning module 27 and a MUA module 28. The operation of these modules will now be further described with reference to FIGS. 2-5. Beginning at Block 40, when a given wireless communications device 21 attempts to configure a mail forwarding or aggregation profile/account with the email server 24, the account provisioning module 27 determines the markup language(s) supported by the given wireless communications device, at Block 41

One way in which this may be done is when the given wireless communications device first communicates with the server 24, the account provisioning module 27 examines the headers found in the user's HTTP request. A user agent header associated with the HTTP request is then matched against various profiles stored in a configuration file (erg., an XML file) or database, for example. That is, the configuration file is created beforehand based upon known device profiles and browser/markup language types, and updated as new devices/browsers/markup languages come online and attempt to access the service. Of course, other approaches for determining the markup languages) supported by a given wireless device may be used, such as those set forth in the above-noted article by Bling, which is hereby incorporated herein in its entirety by reference.

In some circumstances, the account provisioning module 27 may not be able to determine the type of markup language supported by the given wireless communications device 21, at Block 50'. Using the above example, this would occur if a device profile for the given wireless communications device 21 was not previously stored in the configuration file or database. If this is the case, then the account provisioning module 27 may provide a default markup language provisioning template(s) to the given wireless communications device 21 at Block 51'. The default markup language provisioning template may include only common markup language elements supported by all of the plurality of different markup languages. Thus, in accordance with the present example, the default template may be a relatively simple WML template that supports only features that are also supported by XHTML, as will be appreciated by those skilled in the art.

If the account provisioning module 27 is able to determine the markup language(s) supported by the given wireless communications device 21, it then provides the appropriate or corresponding provisioning templates to the given wireless communications device based upon the determined supported markup language, at Blocks 52'-54'. More particularly, if it is determined that the given wireless communications device 21 supports only WML, then a WML-based provisioning template(s) is provided to the device. However, if the account provisioning module 27 determines that the given wireless communications device 21 supports XHTML, or both XHTML and WML, then an XHTML template(s) is provided to the given device. That is, if the given wireless communications device 21 supports two or more markup languages, then the account provisioning module may provide the respective markup language provisioning templates) based upon the most capable one of the supported markup languages In other words, the account provisioning module 27 uses the markup language that has the most features, which in the present example is XHTML, as discussed above.

Two exemplary markup language provisioning templates are shown in FIGS. 2 and 3. Because of the relatively limited room on a wireless communications device display 29, it may be advantageous to use a series of successive templates for collecting user input to provision an email account with the email server 24. This is sometimes referred to as a "deck of cards" approach, as templates are "dealt" to the device one at a time as a user fills in one template and submits the results back to the email server 24. This approach may also be helpful because initially collecting certain preliminary information (such as a unique device identification (ID) may allow the account provisioning module 27 to retrieve additional information about the user from a database (e.g., a database maintained by the wireless communications system provider or email aggregation service provider, etc.). This may reduce the amount of information the account provisioning module 27 has to ask the user for, and also allow certain form fields to be "auto-filled" for verification by the user, also saving the user work, as will be appreciated by those skilled in the art.

A first exemplary WML provisioning template 30 (FIG. 2) is provided to the given wireless communications device 21 so that the user thereof can enter the unique IDs associated with the given device, namely a PIN and an International Mobile Equipment Identity (IMEI), as will be appreciated by those skilled in the art. Of course, different unique IDs may be used in different embodiments. Here, since the exemplary embodiment of WML does not support buttons, the user is provided with a "next" link to submit the entered information to the email server 24 (as well as a "cancel" link to cancel the operation).

A second exemplary XHTML template is for a user to enter other provisioning parameters, such as the email address(es) and password(s) associated with the email account(s) that the user wants the email server 24 to forward email messages from. Here, the browser of the given wireless communications device 21 displays clickable "next account," "done," and "cancel" buttons 32, 33, 34 for the user, since the button feature is supported in XHTML. Further exemplary provisioning parameters that may be used in some embodiments may include a user name, preferred language, etc. Of course, different combinations of the above-noted (or other) provisioning parameters may be used in different embodiments.

Once the requisite provisioning parameter(s) is returned from the given wireless communications device 21 via the markup language template(s), the account provisioning module 27 is then able to generate a provisioned email account for the given wireless communications device based upon the provisioning parameter(s), at Block 43. That is, the account provisioning module 27 stores the appropriate information needed to retrieve and forward emails from the user's designated email box(es) 26 to the given wireless communications device 21, as discussed above. The MUA module 28 may then begin forwarding emails to the given wireless communications device 21 based upon the provisioned email account therefore, at Block 44, thus concluding the illustrated method (Block 45).

Exemplary components of a hand-held mobile wireless communications device 1000 that may be used in accordance the system 20 is further described in the example below with reference to FIG. 6. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 6:
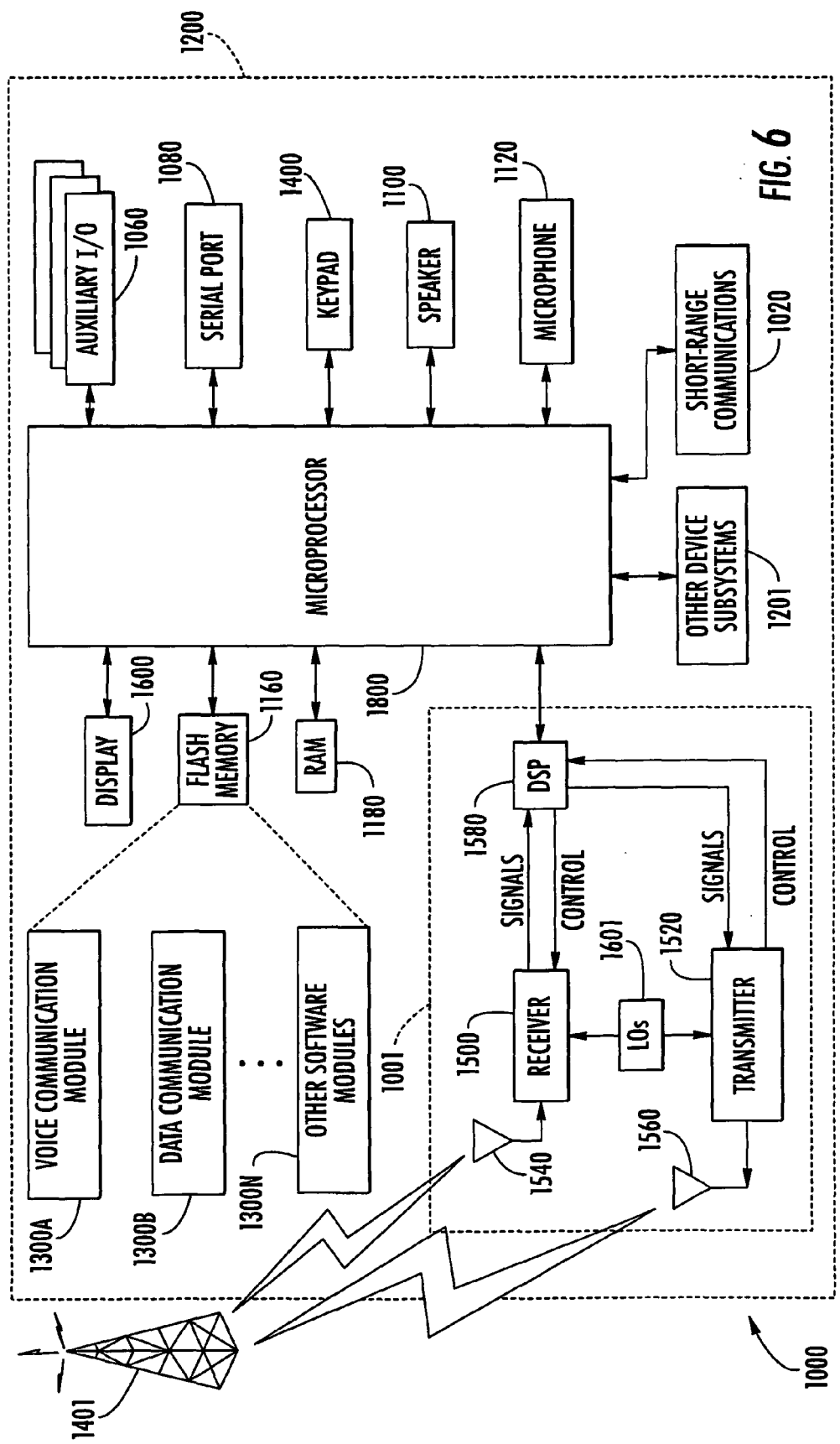
FIG. 6 is a schematic block diagram illustrating exemplary components of a mobile wireless communications device for use with the present invention.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100 and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings Therefore, it is understood that various modifications and embodiments are intended to be included within the scope of the appended claims.

That which is claimed is:

1. An email communications system comprising:
    a plurality of wireless communications devices each supporting at least one markup language from among a plurality of different markup languages; and
    an electronic mail (email) server comprising
        an account provisioning module for determining the at least one markup language supported by a given wireless communications device, providing at least one respective markup language provisioning template to said given wireless communications device based upon the supported at least one markup language, and generating a provisioned email account for said given wireless communications device based upon at least one provisioning parameter returned via the at least one markup language provisioning template,
        said account provisioning module storing a plurality of device profiles for said plurality of wireless communications devices, determining the at least one markup language supported by said given wireless communications device based upon the device profiles and information included in at least one communication with said given wireless communications device, and updating the plurality of device profiles based upon new mobile wireless communications devices attempting to access said account provisioning module, and a mail-user agent module for forwarding emails to said given wireless communications device based upon the provisioned email account therefor.

2. The email communications system of claim 1 wherein each wireless communications device has at least one unique identification (ID) associated therewith; and wherein the at least one provisioning parameter returned via the at least one markup language provisioning template comprises the at least one unique ID of said given wireless communications device.

3. The email communications system of claim 1 wherein the at least one provisioning parameter returned via the at least one markup language provisioning template comprises at least one email address.

4. The email communications system of claim 1 wherein at least one of said plurality of wireless communications devices supports at least two of the plurality of different markup languages; and wherein said account provisioning module provides the at least one respective markup language provisioning template based upon a most capable one of the at least two markup languages.

5. The email communications system of claim 1 wherein said account provisioning module provides a default markup language provisioning template to said given wireless communications device if said account provisioning module is unable to determine the at least one supported markup language.

6. The email communications system of claim 5 wherein the default markup language provisioning template comprises only markup language elements supported by all of the plurality of different markup languages.

7. The email communications system of claim 1 wherein the plurality of markup languages comprises a Wireless Markup Language (WML) and an Extensible Hypertext Markup Language (XHTML).

8. The email communications system of claim 1 wherein said wireless communications devices comprise cellular communications devices.

9. An electronic mail (email) server for use with a plurality of wireless communications devices each supporting at least one markup language from among a plurality of different markup languages, the email server comprising:

an account provisioning module for determining the at least one markup language supported by a given wireless communications device, providing at least one respective markup language provisioning template to the given wireless communications device based upon the supported at least one markup language, and generating a provisioned email account for the given wireless communications device based upon at least one provisioning parameter returned via the at least one markup language provisioning template; and a mail-user agent module for forwarding emails to the given wireless communications device based upon the provisioned email account therefor;

said account provisioning module storing a plurality of device profiles for the plurality of wireless communications devices, determining the at least one markup language supported by the given wireless communications device based upon the device profiles and information included in at least one communication with the given wireless communications device, and updating the plurality of device profiles based upon new mobile wireless communications devices attempting to access said account provisioning module.

10. The email server of claim 9 wherein each wireless communications device has at least one unique identification (ID) associated therewith; and wherein the at least one provisioning parameter returned via the at least one markup language provisioning template comprises the at least one unique ID of the given wireless communications device.

11. The email server of claim 9 wherein the at least one provisioning parameter returned via the at least one markup language provisioning template comprises at least one email address.

12. The email server of claim 9 wherein at least one of the plurality of wireless communications devices supports at least two of the plurality of different markup languages; and wherein said account provisioning module provides the at least one respective markup language provisioning template based upon a most capable one of the at least two markup languages.

13. An electronic mail (email) communications method for a plurality of wireless communications devices each supporting at least one markup language from among a plurality of different markup languages, the method comprising:

determining the at least one markup language supported by a given wireless communications device based upon a plurality of device profiles for the plurality of wireless communications devices and information included in at least one communication from the given wireless communications device;

providing at least one respective markup language provisioning template to the given wireless communications device based upon the supported at least one markup language;

generating a provisioned email account for the given wireless communications device based upon at least one provisioning parameter returned via the at least one markup language provisioning template;

forwarding emails to the given wireless communications device based upon the provisioned email account therefor; and updating the plurality of device profiles based upon attempted access from new mobile wireless communications devices.

14. The method of claim 13 wherein each wireless communications device has at least one unique identification (ID) associated therewith; and wherein the at least one provisioning parameter returned via the at least one markup language provisioning template comprises the at least one unique ID of the given wireless communications device.

15. The method of claim 13 wherein the at least one provisioning parameter returned via the at least one markup language provisioning template comprises at least one email address.

16. The method of claim 13 wherein at least one of the plurality of wireless communications devices supports at least two of the plurality of different markup languages; and wherein providing comprises providing the at least one respective markup language provisioning template based upon a most capable one of the at least two markup languages.

17. A non-transitory computer-readable medium having computer-executable modules comprising:

an account provisioning module for determining the at least one markup language supported by a given wireless communications device from among a plurality of wireless communications devices based upon a plurality of device profiles for the plurality of wireless communications devices and information included in at least one communication from the given wireless communications device, each wireless communications device supporting at least one markup language from among a plurality of different markup languages, providing at least one respective markup language provisioning template to the given wireless communications device based upon the supported at least one markup language, generating a provisioned email account for the given wireless communications device based upon at least one provisioning parameter returned via the at least one markup language provisioning template, and updating the plurality of device profiles based upon new mobile wireless communications devices attempting to access said account provisioning module; and a mail-user agent module for forwarding emails to the given wireless communications device based upon the provisioned email account therefor.

18. The computer-readable medium of claim 17 wherein each wireless communications device has at least one unique identification (ID) associated therewith; and wherein the at least one provisioning parameter returned via the at least one markup language provisioning template comprises the at least one unique ID of the given wireless communications device.

19. The computer-readable medium of claim 17 wherein the at least one provisioning parameter returned via the at least one markup language provisioning template comprises at least one email address.

20. The computer-readable medium of claim 17 wherein at least one of the plurality of wireless communications devices supports at least two of the plurality of different markup languages; and wherein said account provisioning module provides the at least one respective markup language provisioning template based upon a most capable one of the at least two markup languages.

* * * * *